United States Patent
Cheung et al.

(10) Patent No.: US 6,886,997 B2
(45) Date of Patent: May 3, 2005

(54) APPARATUS AND METHOD FOR ACTIVE ALIGNMENT OF OPTICAL COMPONENTS

(75) Inventors: Yiu Ming Cheung, Kowloon (HK); Chou Kee Peter Liu, Kowloon (HK); Ching Hong Yiu, Kowloon (HK)

(73) Assignee: ASM Assembly Automation Ltd. (HK)

( * ) Notice: Subject to any disclaimer, the term of this patent is extended or adjusted under 35 U.S.C. 154(b) by 64 days.

(21) Appl. No.: 10/372,362

(22) Filed: Feb. 24, 2003

(65) Prior Publication Data

US 2004/0165837 A1 Aug. 26, 2004

(51) Int. Cl.$^7$ .................................................. G02B 6/26
(52) U.S. Cl. .............................. 385/90; 385/91; 385/92; 385/93
(58) Field of Search ............................. 385/90–93, 147

(56) References Cited

U.S. PATENT DOCUMENTS

| | | | |
|---|---|---|---|
| 5,666,450 A | 9/1997 | Fujimura et al. | 385/93 |
| 6,325,551 B1 | 12/2001 | Williamson III et al. | 385/88 |
| 6,616,346 B1 * | 9/2003 | Brown et al. | 385/90 |

FOREIGN PATENT DOCUMENTS

| | | |
|---|---|---|
| JP | 03 149511 A | 6/1991 |
| JP | 06 242343 A | 9/1994 |
| JP | 08 122587 A | 5/1996 |

* cited by examiner

*Primary Examiner*—John R. Lee
*Assistant Examiner*—Paul M. Gurzo
(74) *Attorney, Agent, or Firm*—Ostrolenk, Faber, Gerb & Soffen, LLP

(57) ABSTRACT

The invention provides an apparatus and method for the active alignment and coupling of separate optical components consisting of a light-emitting component and a light-receiving component. It comprises first alignment means having a relatively lower optical resolving power stage that is adapted to perform coarse alignment of the light-emitting component to locate an approximate location of its point of highest intensity, and second alignment means having a relatively higher optical resolving power stage that is adapted to perform fine alignment of the light-emitting component to locate a more precise location of the said point of highest intensity. Accordingly, coarse alignment may be performed using a multi-mode fiber and fine alignment may be performed using a single-mode fiber that may further be coupled to the light-emitting component.

41 Claims, 4 Drawing Sheets

APPARATUS AND METHOD FOR ACTIVE ALIGNMENT OF OPTICAL COMPONENTS

FIELD OF THE INVENTION

This invention relates to an apparatus and method for active alignment of optical axes of separate optical components, such as an optical fiber and an optoelectronic device prior to coupling the components to achieve a high optical coupling efficiency. One example of the implementation of this invention is in the manufacture of a single-mode fiber pigtailed laser diode package with an automated assembly machine, although it should be appreciated that the invention is capable of wider application.

BACKGROUND AND PRIOR ART

Automation for the assembly of optoelectronic or photonics devices is an important way to reduce the manufacturing cost of these products. In one such manufacturing process, an optical axis of an optoelectronic device (for example, a light emitting device, photodetector or optical waveguide) is aligned with an optical axis of an optical fiber, and the aligned parts are then mechanically coupled. If the optical coupling efficiency is low, problems like a high loss of optical energy, a short transmission distance and a low signal-to-noise ratio may result.

Thus, high-precision alignment techniques are adopted in the assembly of these products to ensure high performance of the products. Both active and passive alignment techniques have been developed to address the requirement of high coupling efficiency. There are advantages and disadvantages associated with each of these techniques. Generally speaking, passive alignment techniques are faster but ultimately, the precision achieved using these techniques can hardly be less than one micron. In addition, the initial cost for making submounts for performing passive alignment is high. In comparison, with current motion control technology, active alignment techniques can achieve sub-micron accuracy and no passive alignment submount is needed. Unfortunately, most of the active alignment techniques are very time-consuming and therefore also very expensive for manufacturers.

Single-mode pigtailed laser diode devices are among the most common optoelectronic components which are produced in large quantities. A process for manufacturing these devices includes an alignment and coupling process as described above. Despite the simple structure of this device, its manufacturing cost is quite high due to the fact that it may incur a long assembly process time to align a single-mode fiber with a laser diode source actively in order to obtain a product with reasonably high coupling output. As a matter of fact, some manufacturers still rely on manual or semi-automated systems to perform this active alignment in their production lines. In order to reduce the manufacturing cost of this kind of products, a fully-automated system with a short assembly process cycle and high processing yield is needed.

Various techniques have been developed to speed up the active alignment process and to reduce the time needed for obtaining a high coupling efficiency from a laser diode source to a single-mode optical fiber. In U.S. Pat. No. 6,325,551 entitled "Method and Apparatus for Optically Aligning Fibers with Optical Devices", an active alignment technique makes use of a positioning system with a high frequency closed loop optical feedback of a modulated signal to and from a light emitting device under assembly. The technique as described in this US patent imposes some complications on the electronic design and motion control for the system design.

Another prior art is described in U.S. Pat. No. 5,666,450, which describes an infrared position sensitive device (PSD) using InGaAs sensing elements to perform a so-called 'dark search' or 'rough search' of a laser spot before conducting a fine alignment search. This process seeks to reduce the overall alignment process time by dividing the two searches. However, a lot of the process time is still spent on the fine alignment process. The implementation of the technique as described in this US patent is also not easy since the high resolution InGaAs infrared two-dimensional PSD used with the apparatus is very expensive and is not readily available commercially.

The current invention has been especially developed to address the need of assembly automation and the reduction of the alignment process time for these fiber pigtailed devices, although it is also suitable for the coupling of other optoelectronic devices.

SUMMARY OF THE INVENTION

It is an object of the present invention to seek to provide an improved apparatus and method to couple light transmission between different optical components such as between an optoelectronic device and an optical fiber. It is another object of the invention to seek to use different optical resolving powers during alignment of the different components in order to reduce the time taken to perform an alignment process.

According to a first aspect of the invention, the invention provides an apparatus for the active alignment and coupling of separate optical components consisting of a light-emitting component and a light-receiving component, comprising: first alignment means having a relatively lower optical resolving power stage that is adapted to perform coarse alignment of the light-emitting component to locate an approximate location of its point of highest intensity; and second alignment means having a relatively higher optical resolving power stage that is adapted to perform fine alignment of the light-emitting component to locate a more precise location of the said point of highest intensity.

According to a second aspect of the invention, the invention provides a method for the active alignment and coupling of separate optical components consisting of a light-emitting component and a light-receiving component, comprising the steps of: performing coarse alignment of the light-emitting component with a relatively lower optical resolving power stage to locate an approximate location of its point of highest intensity; and performing fine alignment of the light-emitting component with a relatively higher optical resolving power stage to locate a more precise location of the said point of highest intensity.

It will be convenient to hereinafter describe the invention in greater detail by reference to the accompanying drawings which illustrate one embodiment of the invention. The particularity of the drawings and the related description is not to be understood as superseding the generality of the broad identification of the invention as defined by the claims.

DETAILED DESCRIPTION OF THE PREFERRED EMBODIMENT

Figure 1:
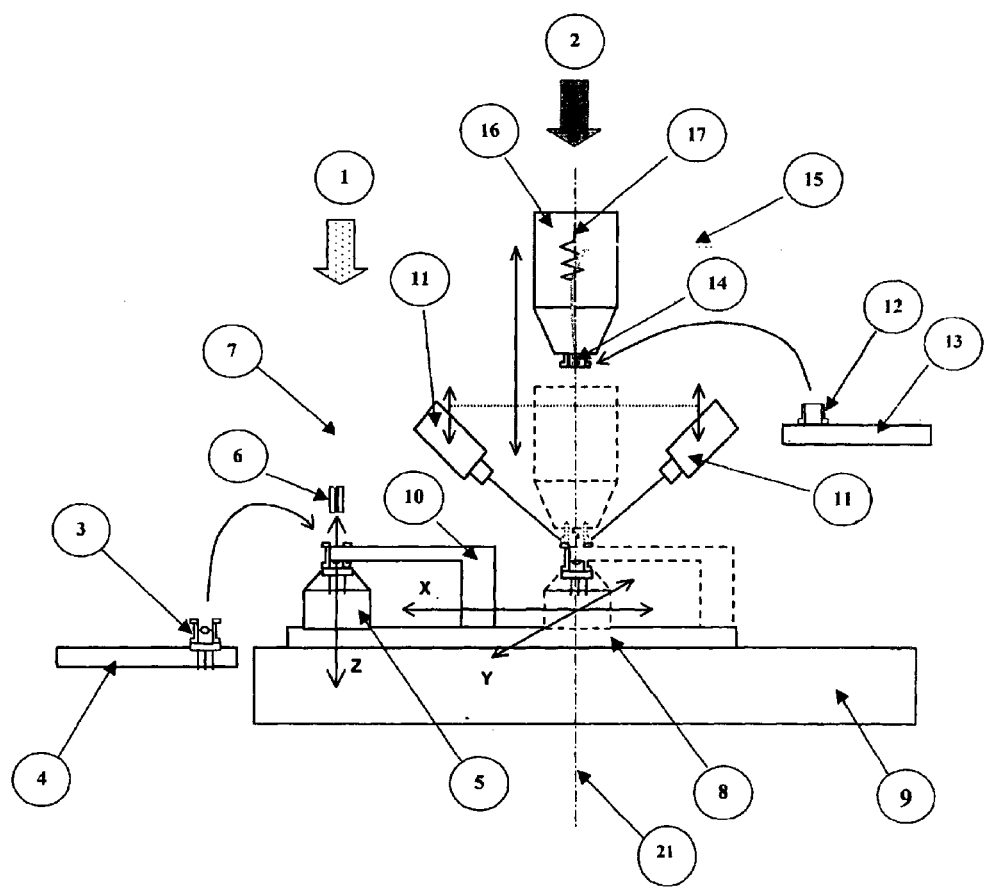
FIG. 1 is a diagrammatic side-view representation of a layout of an automatic alignment and coupling apparatus that includes alignment stages with different optical resolving powers according to the preferred embodiment of the invention.

FIG. 1 is a diagrammatic side-view representation of a layout of an automatic alignment and coupling apparatus that includes alignment stages with different optical resolving powers according to the preferred embodiment of the invention. The apparatus performs alignment using different optical resolving powers to couple separate optical components consisting of a light-emitting component and a light-receiving component. Typically, an optical output of an optoelectronic device such as an infrared laser diode (LD) source 3 is coupled to a light-receiving fiber (e.g. a single-mode fiber (SMF) 15). Generally, the apparatus includes: (i) a first alignment means having a relatively lower optical resolving power stage 1 for coarse alignment search of an approximate location of a point of highest light intensity (or 'hot-spot') of the laser diode source 3 at this stage, and (ii) a second alignment means having a relatively higher optical resolving power stage 2 for fine active alignment search of the point of highest light intensity of the laser diode source 3.

The laser diode source 3, which is welded to a bottom stainless steel alignment sleeve 29 (see FIG. 2), is transferred from a device carrier 4 to be mounted onto a conveying mechanism by a robotic arm (not shown). The conveying mechanism may be in the form of an alignment work chuck 5 held by a device holder 10 and mounted onto a precision X-Y translation stage 8. The work chuck 5 holding the laser diode source 3 can move the device up and down in case alignment in a Z axis is also needed. The work chuck 5 is held firmly by the device holder 10. The precision X-Y translation stage 8 is capable of movement in an X axis and a Y axis, and can transport the work chuck 5 from the coarse alignment stage 1 to the fine alignment stage 2. The X-Y translation stage 8 is mounted on a vibration isolation platform 9.

Figure 2:
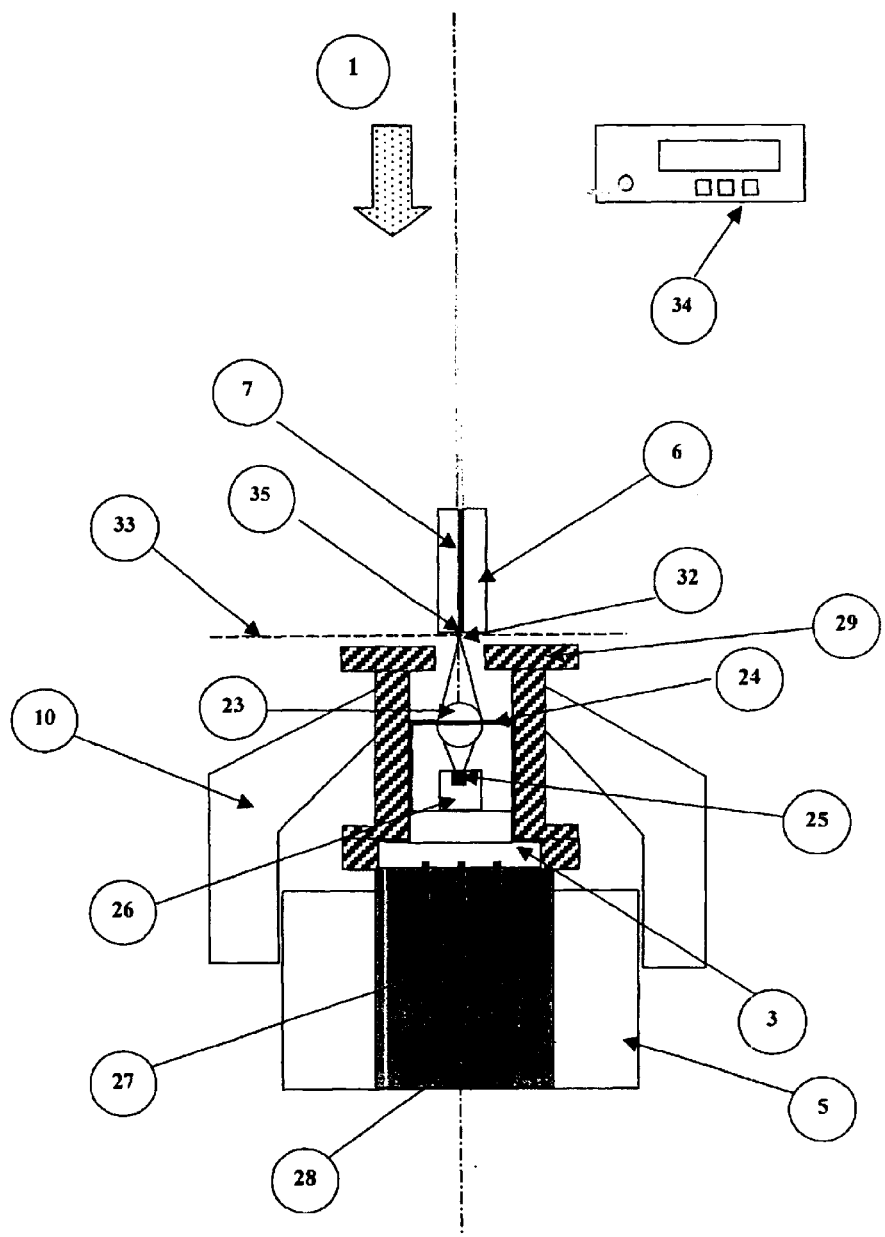
FIG. 2 is a diagrammatic side-view representation of an alignment stage with low optical resolving power of the preferred embodiment.

FIG. 2 is a diagrammatic side-view representation of an alignment stage with low optical resolving power of the preferred embodiment. It illustrates the setup at the low optical resolving power stage 1 for coarse alignment search of the laser spot. The laser diode source 3 is inserted into a socket 28 on the work chuck 5. Through the socket 28, pins 27 of the laser diode source 3 are connected to a low noise current source and this laser diode source 3 will be driven at a selected current with an active optical power feedback mode such that the optical output for the laser diode source 3 is constant. The pins 27 will provide electrical connections for the laser diode source 3 through the socket 28 connecting to a computer controlled laser diode current driver (not shown). Inside the laser diode source 3, a laser diode chip 25 is mounted on a stem 26. An optical detector (not shown) will collect part of the laser light as feedback for the laser diode current driver (not shown) to obtain a constant optical power output. The light output from the laser diode chip 25, after passing through the output lens 23 (e.g. a ball lens), will be focused on a focusing plane 33 to locate a focusing spot 32 or 'hot-spot'. A lens cap 24 ensures that the laser diode chip 25 has a hermetic seal. At the low optical resolving power coarse alignment stage 1, a multi-mode fiber ferrule 6 containing one end of a light-receiving fiber such as a multi-mode fiber (MMF) 7 of core diameter at about 50 microns to 62.5 microns is mounted at a location where the coarse search for the focusing spot 32 of the laser diode source 3 is carried out. The multi-mode fiber ferrule 6 is mounted at a certain level such that its tip 35 is at the nominal focusing plane 33 of the laser diode source 3. Another end of the multi-mode fiber 7 is connected to an optical power meter 34 for detecting the light intensity through the MMF 7.

A light intensity profile of the laser diode source 3 can be obtained by scanning with the MMF 7 laterally within the coarse search window to an order of plus and minus several hundreds of microns. The X-Y stage 8 is adapted to move the laser diode source 3 in minute increments relative to the light-receiving fiber (such as an MMF 7 or a single-mode fiber (SMF) 15). A lower optical resolving power is obtained when the MMF 7 is used as a light collecting media since its numerical aperture (NA) is relatively large at 0.2–0.3. The apparent size of the focusing spot 32 will be enlarged to tens of microns. For the coarse alignment search, the scanning motion of the precision translation X-Y stage 8 can be optimized to a lower motion resolving power to reduce the search time. This search process may be completed in a couple of seconds. It is a significant reduction of search time as compared to the so-called 'dark search' process used by prior art methods that may take up to a couple of minutes. The X-Y translation stage 8 will then move the laser diode source 3 to the high optical resolving power stage 2 where fine active alignment search will be carried out. The translation displacement from the low optical resolving power alignment stage 1 to the high optical resolving power alignment stage 2 is determined by the mechanical set-up and the return value of the searched location of the laser focusing spot 32.

Figure 3:
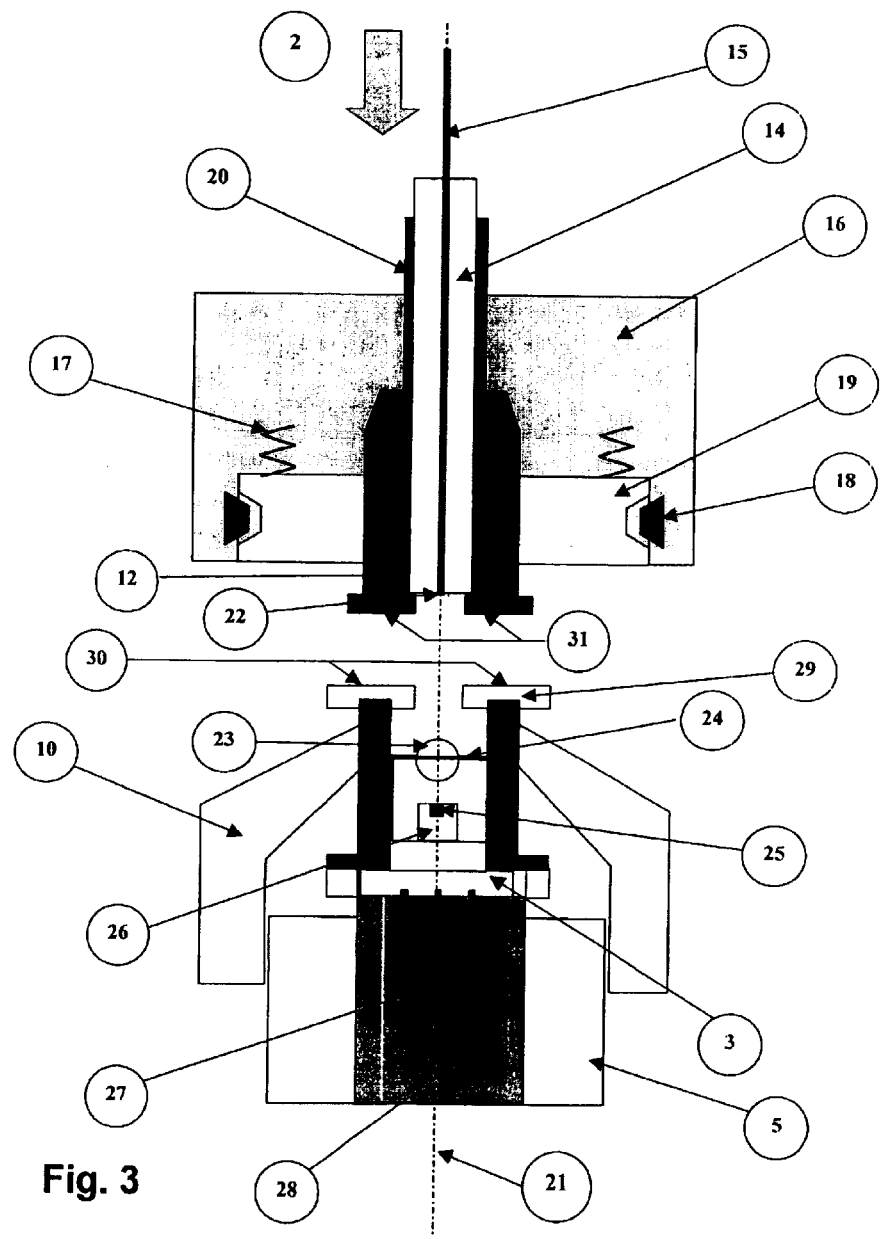
FIG. 3 is a diagrammatic side-view representation of an alignment stage with high optical resolving power of the preferred embodiment.

FIG. 3 is a diagrammatic side-view representation of a high optical resolving power alignment stage 2 of the preferred embodiment. At the high optical resolving power fine alignment stage 2, a light receiving fiber in the form of a single-mode fiber (SMF) 15 inside a single-mode fiber ferrule 14 is held firmly by a sleeve holder 16 which is adapted to move up and down vertically along a reference axis 21. Again, the other end of the SMF 15 is connected to an optical power meter (not shown) that links to a host computer of the apparatus. A top stainless alignment sleeve 12, to which is preferably further attached a solid zirconia sleeve 20, will be transferred into the top sleeve holder 16 from a top sleeve carrier 13 by a robotic arm (not shown). The SMF ferrule 14 is inserted into this top alignment sleeve 12 through the zirconia sleeve 20. This ensures perfect centering and fiber plugging repeatability of the SMF 15 into the top alignment sleeve 12. The top alignment sleeve 12 containing the fiber ferrule 14 and SMF 15 is then clamped firmly by a clamp 19 and a lock 18 inside the top sleeve holder 16.

Before conducting fine active alignment on the lateral X-Y plane, the top sleeve holder 16 containing the fiber plugged with the top alignment sleeve 12 will be lowered down and positioned on top of the bottom alignment sleeve 29 containing the laser diode source 3. The setup of the high optical resolving power stage 2 is constructed in such a way that the tip 22 of the SMF 15 is located at a height where the focusing plane of the laser diode source 3 is located, so that the SMF 15 may obtain the highest light intensity from the peak search along the axial Z direction. The bottom surface 31 of the top alignment sleeve 12 should have good contact with the top surface 30 of the bottom alignment sleeve 29 ensured by applying a sufficient preload vertically from the top sleeve holder 16 through a preload application mechanism 17. A high optical resolving power is obtained when the SMF 15 is used for the fine active alignment along the lateral X-Y axes since the mode-field diameter of the SMF 15 is approximately 10 microns and its numerical aperture (NA) is small at approximately 0.1. The optical coupling efficiency of the SMF 15 is very sensitive to lateral alignment between the SMF 15 and the laser focusing spot 32. A higher coupling efficiency can be obtained if the fiber is aligned to a location where mode matching between the fiber mode and output mode of the laser diode source 3 is at its best. The fine alignment controller will monitor the optical intensity going into the SMF 15 through an optical power meter (not shown). Fine active alignment is conducted by fixing the top alignment sleeve 12 containing the SMF 15 in ferrule 14 and moving the bottom alignment sleeve 29 on the work chuck 5 by very fine lateral motion steps (to the order of tens of nanometers) of the precision translation X-Y stage 8. Fine active alignment at the high optical resolving power stage 2 will be conducted within the fine search region of plus and minus ten microns. This fine active alignment should preferably bring the assemblies to within less than plus or minus one tenth of a micron from the position that the highest output intensity is obtained.

After the completion of the fine alignment, the highest coupling light intensity position of the laser diode 3 is obtained from the SMF 15. The top 12 and bottom 29 alignment sleeves are welded together by YAG laser pulses through a laser processing head 11 (see FIG. 1). A pre-load force is then exerted vertical to the welding parts (top and bottom alignment sleeves) by the preload application mechanism 17 inside the sleeve holder 16 when laser welding is performed in order to minimize any laser post-welding shift. There are preferably three laser processing heads 11 arranged in a circle with the target at the center of the circle. Each processing head 11 is fixed at a position within a working distance from the target and are preferably at 120-degree orientations with respect to each other. The alignment of these processing heads should be good enough to ensure that the laser pulses from the three processing heads point to the same center of the circle and hit the target at the same level such that the laser post welding shift can be minimized.

Figure 4:
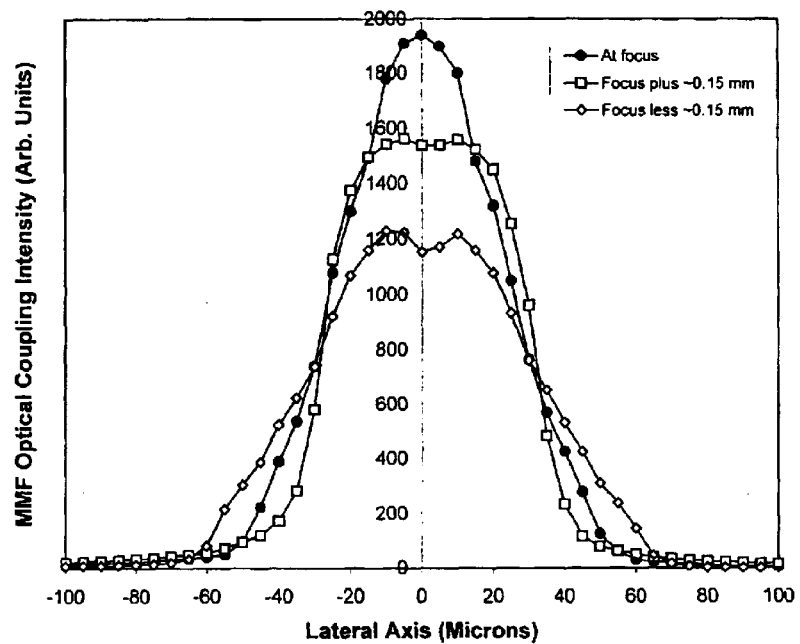
FIG. 4 is a graphical representation of a profile of a coupled light intensity of a laser diode source obtained through a multi-mode fiber.

A typical light intensity profile obtained from the laser diode output when scanning using the MMF 7 is shown in FIG. 4. The profile marked with circles represents the intensity profile obtained by scanning the lateral (X-Y) plane at the focusing height of the laser diode output. It is observed that the basic shape and the location of the peak center do not change rapidly even with out-focusing (e.g. by 0.15 mm) of the MMF 7, as shown by the profiles marked with squares and diamonds in FIG. 4. This low optical resolving power search stage 1 may locate the center position of the laser focusing spot 32 to within an accuracy of less than plus or minus ten microns.

Figure 5:
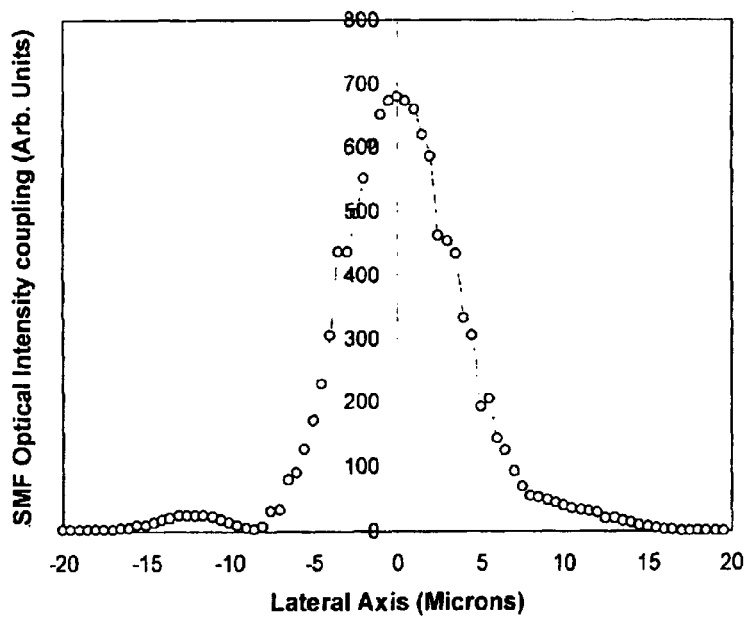
FIG. 5 is a graphical representation of a profile of a coupled light intensity of a laser diode source obtained through a single mode fiber.

FIG. 5 shows a typical light intensity profile obtained from the laser diode output through scanning with the SMF 15. In order to reduce the total search time, the fine alignment search window should be confined to within plus or minus ten microns, which search window has been determined from the coarse alignment search.

With this dual-resolving power alignment setup for the assembly of an optoelectronic device such as a fiber pigtailed laser diode, the total alignment time needed is reduced. The time required for searching for laser 'hot spots' or focusing points in the coarse alignment stage using the multi-mode fiber probe can be reduced since a lower resolving power scanning motion is adopted by the precision translation X-Y stage. This scanning process may be completed within a couple of seconds even if the search window is as large as a few hundred microns. Therefore there will be a significant reduction of search time for the so-called 'dark search' process, which may take up to a couple of minutes using traditional methods of scanning for alignment. Thereafter, a fine alignment search can be done with a much smaller fine search window of a range of plus and minus tens of microns at the high resolving power stage, thereby reducing the process time for fine alignment.

The invention described herein is susceptible to variations, modifications and/or additions other than those specifically described and it is to be understood that the invention includes all such variations, modifications and/or additions which fall within the spirit and scope of the above description.

What is claimed is:

1. Apparatus for the active alignment and coupling of separate optical components including a light-emitting component and a light-receiving component, the apparatus comprising:

a first alignment station including a first optical device having a first optical resolving power which is operative to perform coarse alignment between the light-emitting component and the first optical device according to an approximate location of a point of highest light-emission intensity; and a second alignment station including a second optical device having a higher optical resolving power than that of the first optical device which is operative to perform fine alignment between the light-emitting component and the second optical device to locate the point of highest light-emission intensity with greater precision than the first alignment station.

2. Apparatus according to claim 1, including a conveying mechanism on which the light-emitting optical component is mountable, whereby to shift a position of the optical component.

3. Apparatus according to claim 2, wherein the conveying mechanism is adapted to move the optical component between the first alignment means and the second alignment means.

4. Apparatus according to claim 2, wherein the conveying mechanism is further adapted to move the light-emitting optical component in minute increments relative to the first and second optical devices respectively, whereby to scan and locate the point at which the light-emission intensity of the light-emitting component is highest.

5. Apparatus according to claim 2, wherein the conveying mechanism is capable of moving the optical component in x, y and z axes.

6. Apparatus according to claim 2, wherein the conveying mechanism includes a work chuck adapted to receive a mating portion of the optical component so as to provide electrical power to the optical component at various positions relative to the first and second optical devices respectively.

7. Apparatus according to claim 1, wherein the first optical device comprises lower resolving power light-receiving optical fiber associated with the first alignment means that is locatable over the light-emitting component, wherein the lower resolving power light-receiving optical fiber is connectable to a power detector to detect an intensity of light emitted by the light-emitting component at various positions relative to the light-emitting component.

8. Apparatus according to claim 7, wherein the lower resolving power light-receiving fiber has a numerical aperture of between approximately 0.2 and 0.3.

9. Apparatus according to claim 7, wherein the lower resolving power light-receiving fiber is a multi-mode fiber.

10. Apparatus according to claim 1, wherein the second optical device comprises a higher resolving power light-receiving optical fiber associated with the second alignment means that is locatable over the light-emitting component, wherein the higher resolving power light-receiving optical fiber is connectable to a power detector to detect an intensity of light emitted by the light-emitting component at various positions relative to the light-emitting component.

11. Apparatus according to claim 10, wherein the higher resolving power light-receiving fiber has a numerical aperture of approximately 0.1 or less.

12. Apparatus according to claim 10, wherein the higher resolving power light-receiving fiber is a single-mode fiber.

13. Apparatus according to claim 12, wherein the higher resolving power light-receiving fiber is a single-mode fiber to be coupled to the light-emitting component.

14. Apparatus according to claim 1, wherein approximate location of the point of highest intensity is found to an accuracy of within tens of microns.

15. Apparatus according to claim 1, wherein the more exact location of the point of highest intensity is found to an accuracy of less than one micron.

16. Apparatus according to claim 1, including an alignment sleeve that is attachable to the light-receiving component and is adapted to be positioned with the light-receiving component over the light-emitting component for coupling.

17. Apparatus according to claim 16, including coupling means to couple the alignment sleeve together with the light-receiving component to the light-emitting component.

18. Apparatus according to claim 16, wherein the coupling means comprises one or more laser processors capable of discharging laser beams to weld the alignment sleeve to the light-emitting component.

19. Apparatus according to claim 18, wherein if there are a plurality of laser processors, the laser processors are arranged equidistant from one another in a circular fashion with their target at the center of the circle.

20. Apparatus according to claim 18, including a preload application mechanism adapted to assert a preload force between the alignment sleeve and light-emitting component during welding.

21. Apparatus according to claim 1, wherein the first and second alignment means are mounted on a vibration isolation platform.

22. Apparatus according to claim 1, wherein the second optical device comprises the light-receiving optical component.

23. A method for active alignment and coupling of separate optical components including a light-emitting component and a light-receiving component, the method comprising the steps of:

performing coarse alignment between the light-emitting component and a first optical device having first optical resolving power according to an approximate location of a point of highest light-emission intensity; and performing fine alignment between the light-emitting component and a second optical device having a higher optical resolving power than that of the first optical device to locate the point of highest light-emission intensity with greater precision than the coarse alignment.

24. A method according to claim 23, including conveying the light-emitting optical component between a first alignment position whereat coarse alignment is carried out and a second alignment position whereat fine alignment is carried out.

25. A method according to claim 23, including moving the light-emitting optical component in minute increments relative to the first and second optical devices respectively, whereby to scan and locate a point at which light-emission intensity of the light-emitting component is highest.

26. A method according to claim 25, including moving the optical component in x, y and z axes.

27. A method according to claim 23, wherein the step of performing coarse alignment includes locating the first optical device comprising a lower resolving power light-receiving optical fiber over the light-emitting component, and connecting the higher resolving power light-receiving fiber to a power detector to detect an intensity of light emitted by the light-emitting component at various positions relative to the light-emitting component.

28. A method according to claim 27, wherein the lower resolving power light-receiving fiber has a numerical aperture of between approximately 0.2 and 0.3.

29. A method according to claim 27, wherein the lower resolving power light-receiving fiber is a multi-mode fiber.

30. A method according to claim 23, wherein the step of performing fine alignment includes locating the second optical device comprising a higher resolving power light-receiving optical fiber over the light-emitting component, and connecting the higher resolving power light-receiving fiber to a power detector to detect an intensity of light emitted by the light-emitting component at various positions relative to the light-emitting component.

31. A method according to claim 30, wherein the higher resolving power light-receiving fiber has a numerical aperture of approximately 0.1 or less.

32. A method according to claim 30, wherein the higher resolving power light-receiving fiber is a single-mode fiber.

33. A method according to claim 32, wherein the higher resolving power light-receiving fiber is a single-mode fiber to be coupled to the light-emitting component.

34. A method according to claim 23, wherein approximate location of the point of highest intensity is found to an accuracy of within tens of microns.

35. A method according to claim 23, wherein the more exact location of the point of highest intensity is found to an accuracy of less than one micron.

36. A method according to claim 23, including fixing the light-receiving component over a position of the light-emitting component whereat the light intensity is highest.

37. Apparatus according to claim 36, including attaching an alignment sleeve to the light-receiving component, whereby to couple the alignment sleeve and single-mode fiber to the light-emitting component.

38. A method according to claim 37, including the use of laser processors to weld the alignment sleeve to the light-emitting component during said coupling.

39. A method according to claim 38, wherein if there are a plurality of laser processors, arranging the laser processors to be equidistant from one another in a circular fashion with their target at the center of the circle.

40. A method according to claim 38, including exerting a preload force between the alignment sleeve and light-emitting component during welding.

41. A method according to claim 23, wherein the second optical device comprises the light-receiving optical component.

* * * * *